US011991514B2

(12) United States Patent
Nonaka et al.

(10) Patent No.: US 11,991,514 B2
(45) Date of Patent: May 21, 2024

(54) SOUND PROCESSING APPARATUS AND CONTROLLING METHOD OF SOUND PROCESSING APPARATUS

(71) Applicant: YAMAHA CORPORATION, Hamamatsu (JP)

(72) Inventors: Takeshi Nonaka, Hamamatsu (JP); Kotaro Terada, Hamamatsu (JP); Arata Imai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 317 days.

(21) Appl. No.: 17/683,625

(22) Filed: Mar. 1, 2022

(65) Prior Publication Data

US 2022/0279301 A1 Sep. 1, 2022

(30) Foreign Application Priority Data

Mar. 1, 2021 (JP) ................................ 2021-031536

(51) Int. Cl.
*H04S 7/00* (2006.01)
*H04S 3/00* (2006.01)

(52) U.S. Cl.
CPC ................ *H04S 7/30* (2013.01); *H04S 3/008* (2013.01); *H04S 2400/01* (2013.01)

(58) Field of Classification Search
CPC ......... H04S 7/30; H04S 3/008; H04S 2400/01
USPC ........................................... 381/119; 700/48
See application file for complete search history.

(56) References Cited

U.S. PATENT DOCUMENTS

| | | | | |
|---|---|---|---|---|
| 11,750,309 B2 * | 9/2023 | Saito | H04H 60/04 | 381/119 |
| 2006/0079968 A1 * | 4/2006 | Takemura | H04H 60/04 | 700/48 |
| 2006/0222189 A1 * | 10/2006 | Terada | H04H 60/04 | 381/119 |
| 2007/0053529 A1 * | 3/2007 | Suyama | H04H 60/04 | 381/119 |
| 2022/0256290 A1 * | 8/2022 | Soma | H04H 60/04 | |

FOREIGN PATENT DOCUMENTS

JP 2007088872 A 4/2007

* cited by examiner

*Primary Examiner* — David L Ton
(74) *Attorney, Agent, or Firm* — ROSSI, KIMMS & McDOWELL LLP

(57) ABSTRACT

A controlling method including controlling signal processing of the channel assigned to each of the plurality of first physical controllers, based on a parameter indicated by each of the plurality of first physical controllers, enabling a parameter change operation by the plurality of first physical controllers when a channel group set to be enabled by the third physical controller is designated, and disabling the parameter change operation by the plurality of first physical controllers when a channel group set to be disabled by the third physical controller is designated.

12 Claims, 10 Drawing Sheets

SOUND PROCESSING APPARATUS AND CONTROLLING METHOD OF SOUND PROCESSING APPARATUS

CROSS REFERENCE TO RELATED APPLICATIONS

This Nonprovisional application claims priority under 35 U.S.C. § 119(a) on Patent Application No. 2021-031536 filed in Japan on Mar. 1, 2021, the entire contents of which are hereby incorporated by reference.

BACKGROUND

Technical Field

An embodiment of the present disclosure relates to a sound processing apparatus and a controlling method of a sound processing apparatus.

Background Information

Japanese Unexamined Patent Application Publication No. 2007-088872 discloses a digital mixer that allows a guest user to utilize various functions within the limits of the authority granted to the guest user.

The digital mixer disclosed in Japanese Unexamined Patent Application Publication No. 2007-088872 does not prohibit an operation to a plurality of faders provided corresponding to each of a plurality of channels.

SUMMARY

An object of an embodiment of the present disclosure is to provide a sound processing apparatus capable of setting operation authority over physical controllers such as a plurality of faders, and a controlling method of such the sound processing apparatus.

A sound processing apparatus according to an embodiment of the present disclosure includes a plurality of first physical controllers provided corresponding to each of a plurality of channels, and changing a parameter in each of the plurality of channels, a second physical controller that designates a channel to be assigned to each of the plurality of first physical controllers, to at least either a first channel group or a second channel group, a third physical controller that receives an enablement-disablement setting of an operation to the plurality of first physical controllers for at least either the first channel group or the second channel group, and a processor that controls signal processing of the channel assigned to each of the plurality of first physical controllers, based on a parameter indicated by each of the plurality of first physical controllers, enables a parameter change operation by the plurality of first physical controllers when a channel group set to be enabled by the third physical controller is designated, and disables the parameter change operation by the plurality of first physical controllers when a channel group set to be disabled by the third physical controller is designated.

According to an embodiment of the present disclosure, operation authority over physical controllers such as a plurality of faders is able to be set.

DETAILED DESCRIPTION

Figure 1:
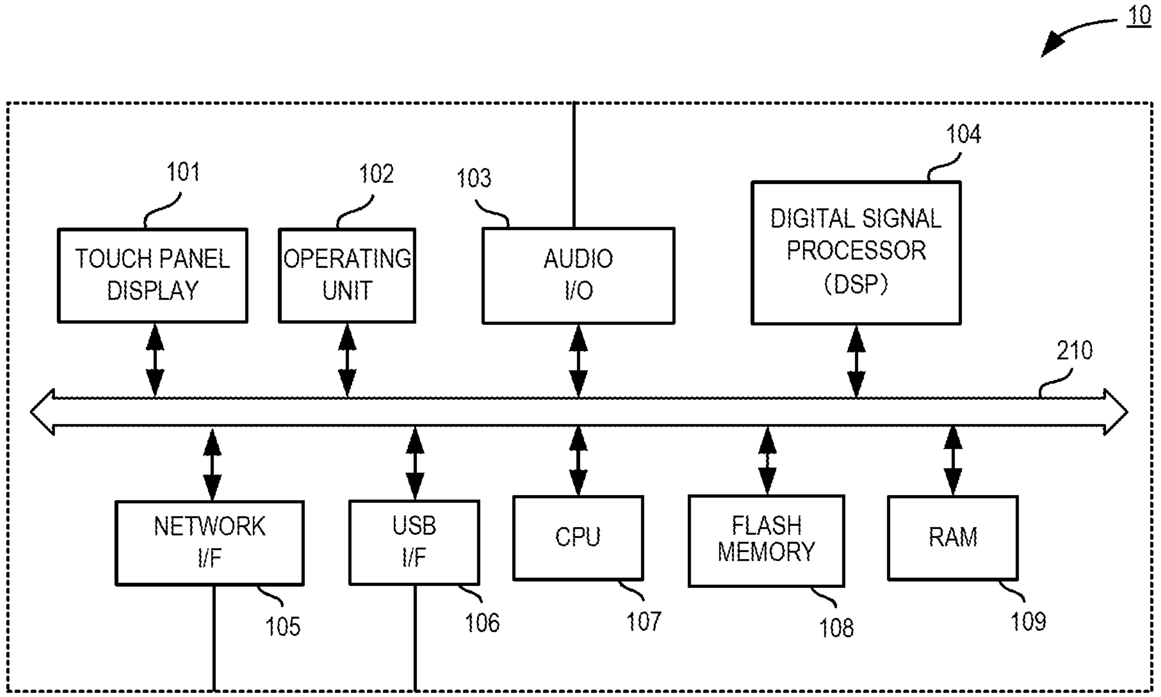
FIG. 1 is a block diagram showing a hardware configuration of an audio mixer.
Figure 2:
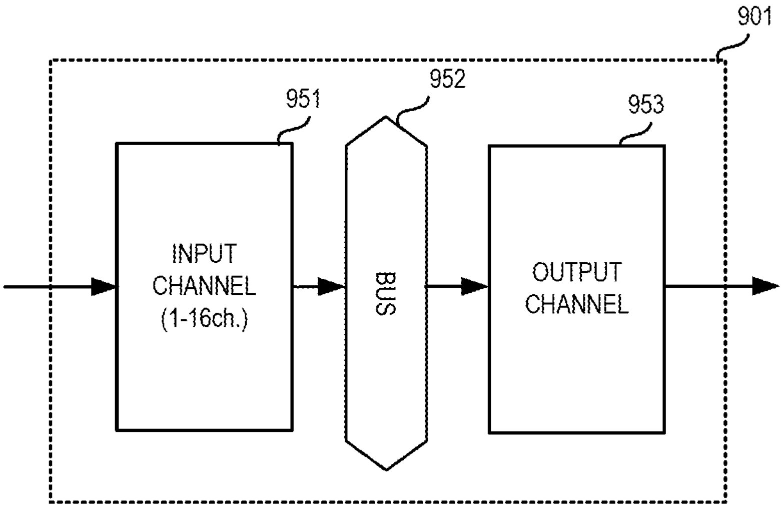
FIG. 2 is a diagram showing a functional configuration of a signal processing block.
Figure 3:
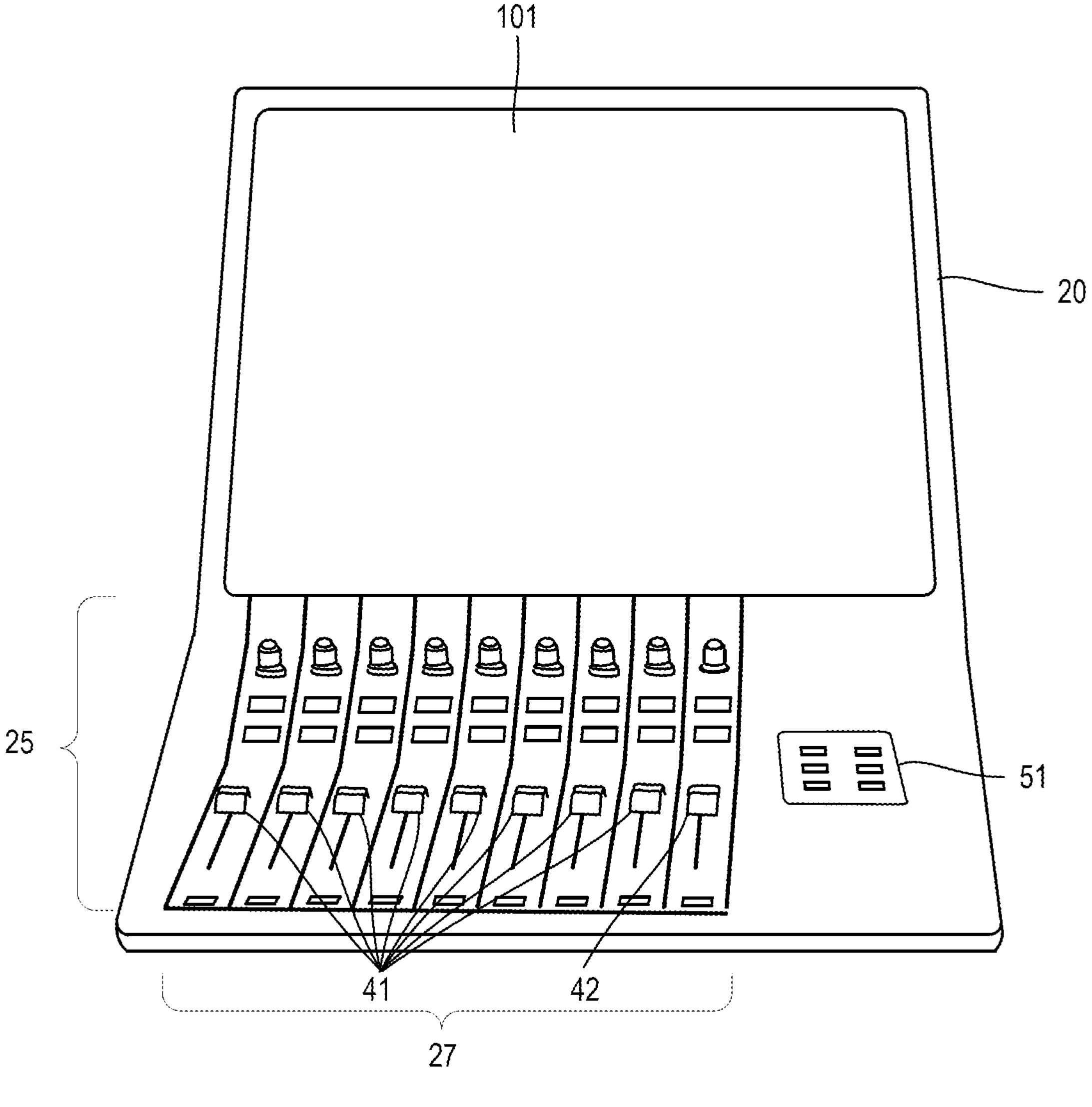
FIG. 3 is a front perspective view of the audio mixer.

FIG. 1 is a block diagram showing a hardware configuration of an audio mixer. FIG. 2 is a diagram showing a functional configuration of a signal processing block of the audio mixer. FIG. 3 is a front perspective view of the audio mixer.

The audio mixer 10 is an example of a sound processing apparatus according to the present disclosure. The audio mixer 10 receives an input of an audio signal from an acoustic device such as a microphone or a musical instrument. The audio mixer 10 performs signal processing such as mixing processing or effect processing, on an inputted audio signal. The audio mixer 10 sends the audio signal on which the signal processing has been performed, to an acoustic device such as a speaker.

The audio mixer 10 includes a touch panel display 101, an operating unit 102, an audio I/O (Input/Output) 103, a digital signal processor (DSP) 104, a network I/F (interface) 105, a USB I/F 106, a CPU 107, a flash memory 108, and a RAM 109. These components are connected to each other through a bus 210.

The CPU 107 is a processor that controls an operation of the audio mixer 10. The CPU 107 reads and executes a predetermined program stored in the flash memory 108 being a storage medium to the RAM 109 and performs various types of operations. It is to be noted that the program does not need to be stored in the flash memory 108 of the own device. For example, the program may be downloaded each time from another device such as a server and may be read out to the RAM 109.

The CPU 107 performs input and output of an audio signal in the audio I/O 103, control of mixing processing in the digital signal processor 104, control of effect processing, a change in a value of a parameter related to such processing, and the like.

The touch panel display 101 may include an LCD (Liquid Crystal Display) and a touch panel laminated on the LCD, for example. The touch panel display 101 displays various types of information according to the control of the CPU 107. In addition, the touch panel display 101 receives an operation from a user. The touch panel display 101 is an example of the third physical controller of the present disclosure.

The operating unit 102 includes various physical controllers such as a switch, a knob, or a fader, and receives an operation to the audio mixer 10, from a user.

The digital signal processor 104 is configured by a plurality of DSPs (Digital Signal Processors) for performing various types of signal processing such as mixing processing or effect processing. The digital signal processor 104 performs signal processing such as mixing processing or effect processing on an audio signal inputted from the audio I/O 103, the network I/F 105, or the USB I/F 106. The digital signal processor 104 outputs the audio signal on which the signal processing has been performed, through the audio I/O 103, the network I/F 105, or the USB I/F 106.

As shown in FIG. 2, a signal processing block 901 is configured by an input channel 951, a bus 952, and an output channel 953. In this example, the input channel 951 has 16 (1-16) channels. The bus 952 has various types of buses such as a stereo bus, a MIX bus, and a MATRIX bus. The output channel 953 is a block that processes the audio signal sent out from each bus.

Each channel of the input channel 951 performs effect processing such as an equalizer (EQ) or a compressor (COMP) on an inputted audio signal. Each channel in the input channel 951 sends out the audio signal on which the signal processing has been performed, to the bus 952 provided in the subsequent stage. The level of the audio signal that the input channel sends out is adjusted by a fader 41, for example.

The bus 952 mixes audio signals sent out from each input channel, and outputs the audio signal to the output channel 953.

The output channel 953 performs effect processing such as an equalizer or a compressor on an inputted audio signal. The audio signal on which the signal processing has been performed is supplied to the audio I/O 103, the network I/F 105, or the USB I/F 106.

As shown in FIG. 3, the audio mixer 10 includes a housing 20. The touch panel display 101 is disposed at the front upper portion of the housing 20. An operation panel 25 is disposed at a front lower portion of the housing 20. In the operation panel 25, a channel strip section 27 and a fader bank area 51 are disposed.

The channel strip section 27 includes eight input channel sections and one master section. A plurality of physical controllers including a plurality of faders 41 are disposed at each input channel section. A fader 42 is disposed at the master section. A user operates the fader 41 and controls the level of each input channel. In addition, a user operates the fader 42 of the master section and adjusts an output level. The fader 41 is an example of a first physical controller of the present disclosure.

Figure 4:
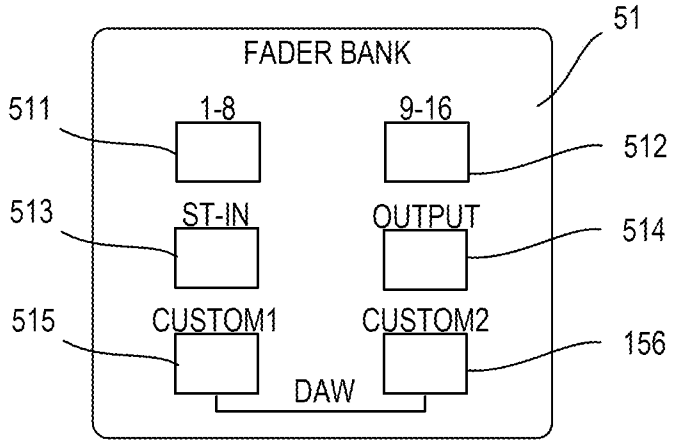
FIG. 4 is an enlarged view of a fader bank area 51.

FIG. 4 is an enlarged view of a fader bank area 51. The fader bank area 51 has a 1-8 bank switch 511, a 9-16 bank switch 512, an ST-IN switch 513, an OUTPUT switch 514, a CUSTOM1 switch 155, and a CUSTOM2 switch 156.

The 1-8 bank switch 511, the 9-16 bank switch 512, the ST-IN switch 513, the OUTPUT switch 514, the CUSTOM1 switch 155, and the CUSTOM2 switch 156 each are an example of the second physical controller of the present disclosure. These switches designate a channel to be assigned to each of the plurality of faders 41 being the plurality of first physical controllers to at least either a first channel group (input channels 1-8, for example) or a second channel group (an optional channel group, for example).

For example, when the 1-8 bank switch 511 is selected, the eight input channel sections in the channel strip section 27 serve as sections of the input channels 1 to 8 being an example of the first channel group. When the 9-16 bank switch 512 is selected, the eight input channel sections in the channel strip section 27 serve as sections of the input channels 9 to 16 being an example of the first channel group. The 1-8 bank switch 511 and the 9-16 bank switch 512 are switches to designate a fixed mode in which the channel to be assigned to each of the eight faders 41 being the first physical controllers is previously fixed.

When the ST-IN switch 513 is selected, the eight input channel sections in the channel strip section 27 serve as various section levels including a stereo channel. When the OUTPUT switch 514 is selected, the eight input channel sections in the channel strip section 27 serve as sections to adjust an amount of feed to the various types of buses such as the stereo bus, the MIX bus, and the MATRIX bus.

When either the CUSTOM1 switch 155 or the CUSTOM2 switch 156 is selected, the eight input channel sections in the channel strip section 27 serve as sections of an optional channel assigned to a user. The user can designate the channel to be assigned to the eight faders 41, when selecting the CUSTOM1 switch 155 or the CUSTOM2 switch 156 through the touch panel display 101. The channel group designated on the touch panel display 101 corresponds to the second channel group of the present disclosure.

In such a manner, the CUSTOM1 switch 155 and the CUSTOM2 switch 156 are switches to designate a custom mode in which the channel to be assigned to each of the eight faders 41 being the first physical controllers is able to be optionally set.

In addition, when the CUSTOM1 switch 155 and the CUSTOM2 switch 156 are selected simultaneously, the eight input channel sections in the channel strip section 27 serve as a physical controller to receive an operation to a different sound processing apparatus connected to the audio mixer 10. The different sound processing apparatus may be a personal computer ((hereinafter referred to as a PC) connected to the audio mixer 10, for example. The PC executes an application program of a DAW (Digital Audio Workstation). A user performs work such as recording or editing of an audio signal received from the audio mixer 10 through the DAW of the PC. When the CUSTOM1 switch 155 and the CUSTOM2 switch 156 are selected simultaneously, the eight faders 41 in the channel strip section 27 serve as a physical controller to adjust a parameter to each track under editing with the DAW of the PC.

In such a manner, normally, the fader 41 has a first mode of functioning as a physical controller to change a parameter of the audio mixer 10 being the own device, and a second mode of functioning as a physical controller to execute a function for another sound processing apparatus connected to the audio mixer 10.

Then, the audio mixer 10 according to the present embodiment enables or disables an operation of a specific bank for each user, at the eight faders 41 in the channel strip section 27.

Figure 5:
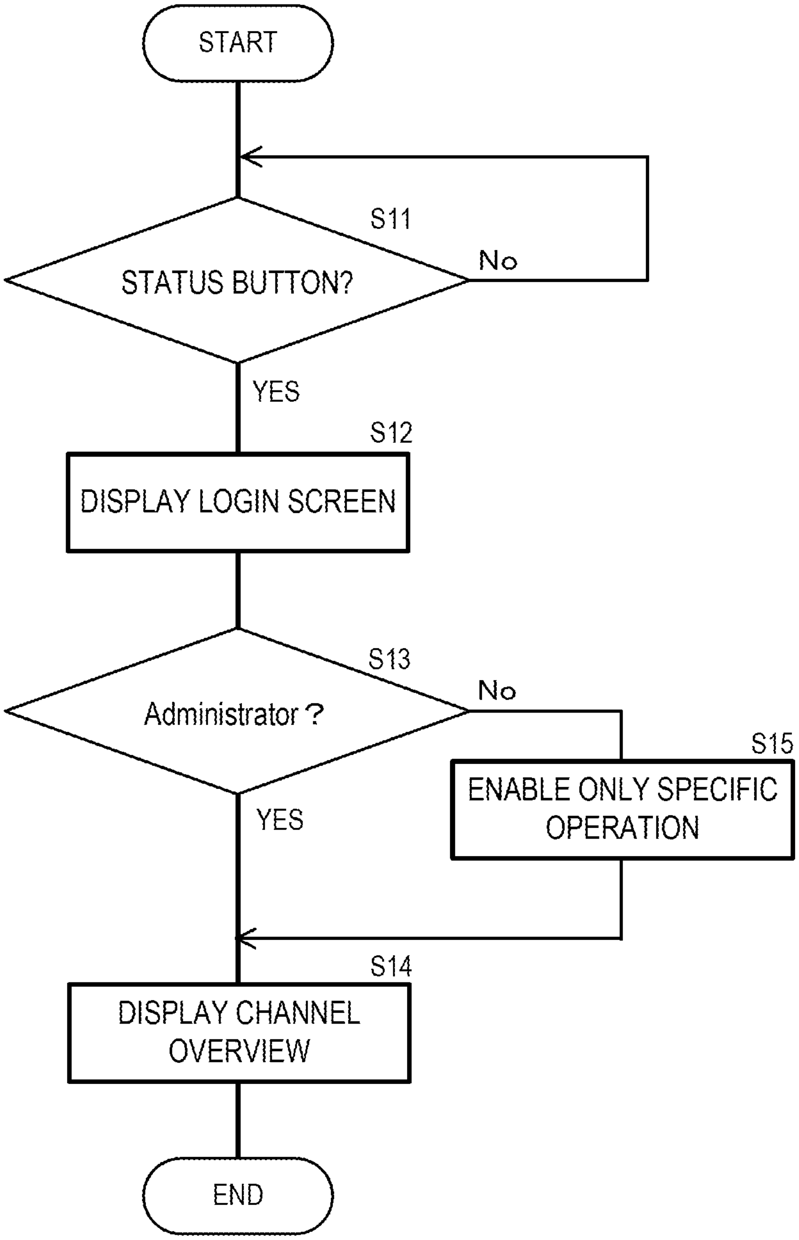
FIG. 5 is a flow chart showing an operation of the audio mixer.
Figure 6:
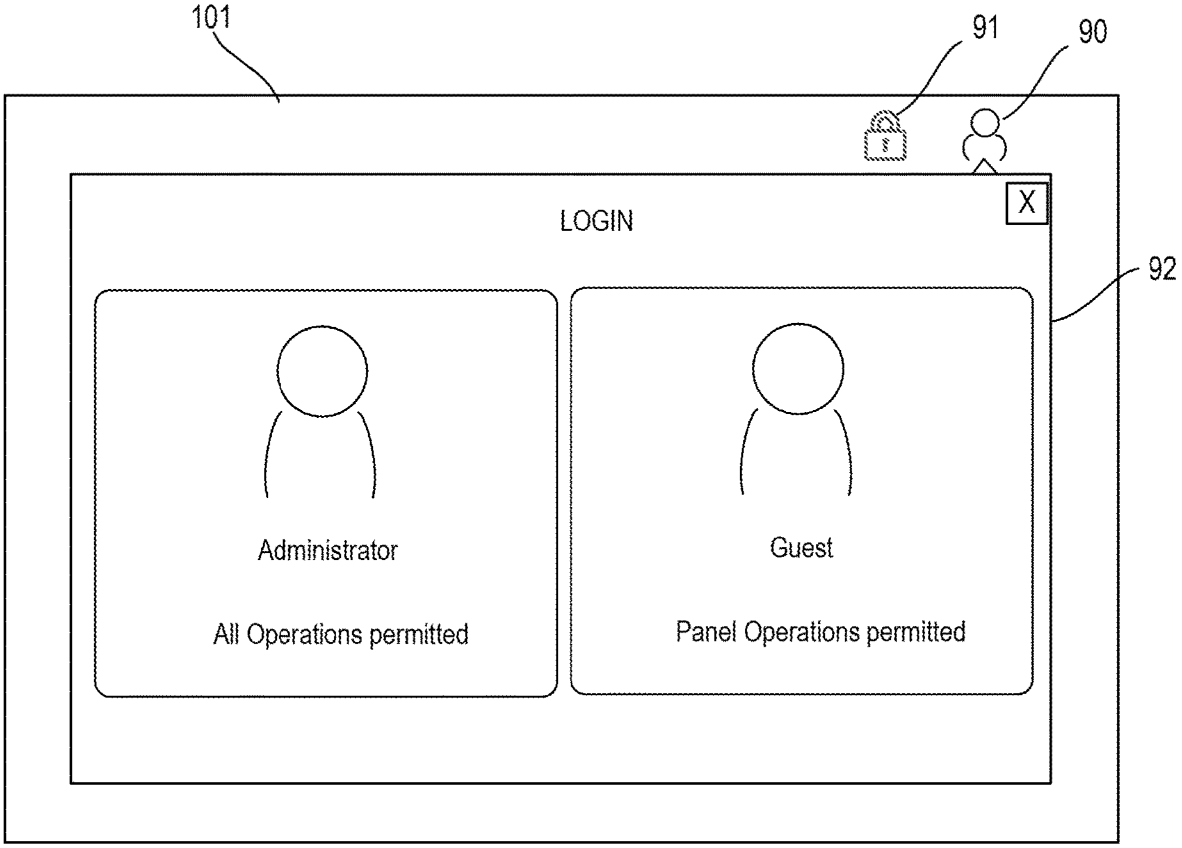
FIG. 6 is a diagram showing an example of a GUI displayed on a touch panel display 101.

FIG. 5 is a flow chart showing an operation of the audio mixer 10. FIG. 6 is a view showing an example of a GUI displayed on the touch panel display 101. First, the audio mixer 10 determines whether or not a status button has been operated through the touch panel display 101 (S11). As shown in FIG. 6, the touch panel display 101 always displays a status button 90 and a key button 91. The touch panel display 101 displays a LOGIN screen 92 shown in FIG. 6, when receiving an operation of the status button 90 is received (S12). It is to be noted that the touch panel display 101 may also display the LOGIN screen 92 at startup of the audio mixer 10.

The touch panel display 101 displays a selection screen of an administrator (a first user) or a guest user (a second user) on the LOGIN screen 92. A user selects either an administrator or a guest user. The administrator is a user of which all the operations to the audio mixer 10 are enabled. The guest user is a user of which only a specific operation is enabled.

The audio mixer 10 checks whether the administrator is selected or not (S13). It is to be noted that the audio mixer 10, when the administrator is selected, may perform authentication such as password input or biometrics using a fingerprint, an iris, or a face. The audio mixer 10 determines that the administrator has been selected when the authentication of a proper password input is performed.

Figure 7:
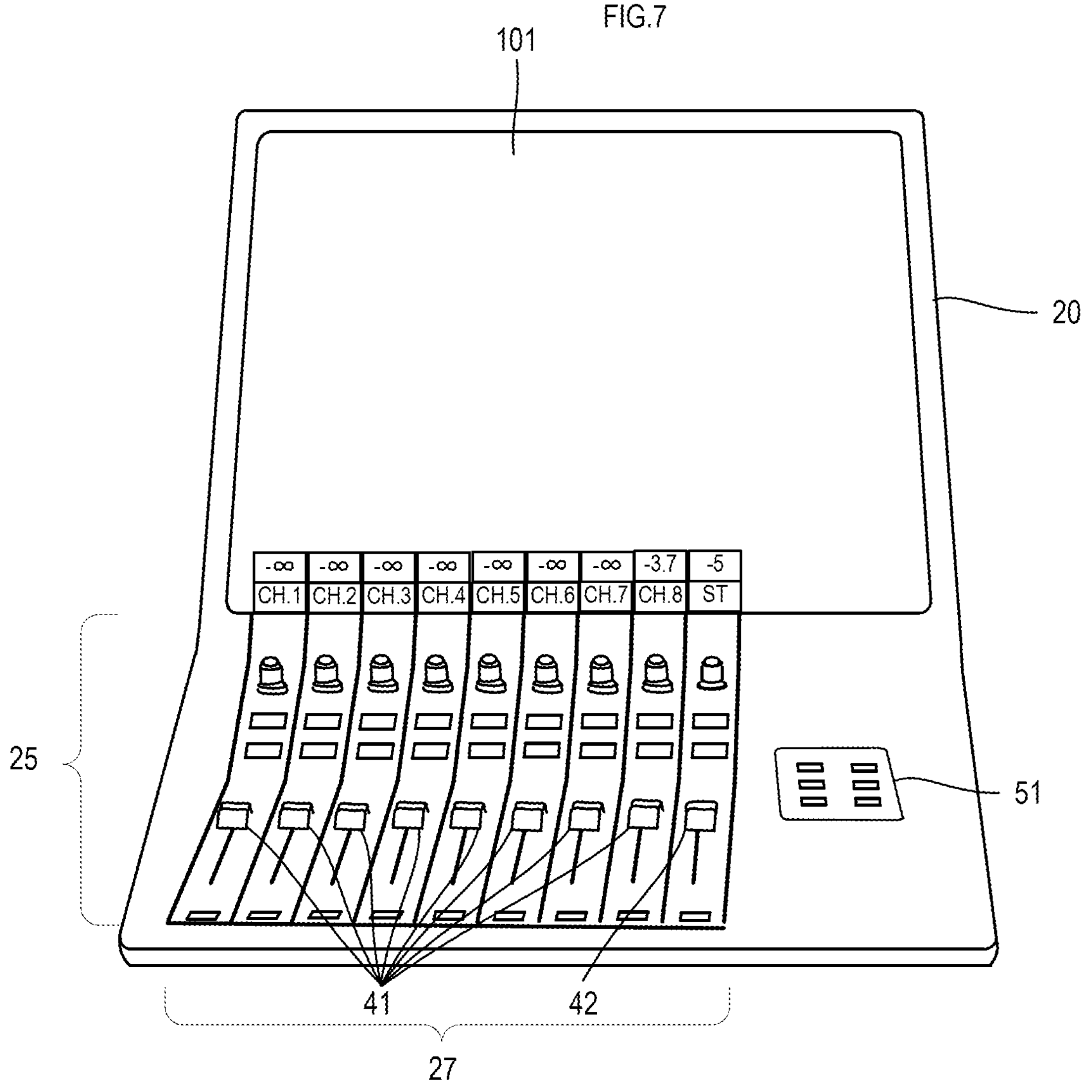
FIG. 7 is a view showing an example of a channel overview screen.

When the administrator is selected, the audio mixer 10 displays a channel overview screen (S14). FIG. 7 is a view showing an example of the channel overview screen. The touch panel display 101 displays a channel name and a gain value corresponding to each channel section in the channel strip section 27, on the channel overview screen. In the example of FIG. 7, the 1-8 bank switch 511 is selected, and the eight input channel sections in the channel strip section 27 serve as a section of the input channels 1 to 8 being an example of the first channel group. Therefore, the touch panel display 101 displays the name and gain value of the input channels 1 to 8 corresponding to each channel section. When a user operates the fader 41, the touch panel display 101 changes the display of the gain value of a corresponding channel.

On the other hand, the audio mixer 10, in a case in which not an administrator but a guest user is selected, enables only a specific operation (S15), and displays a channel overview screen (S14). It is to be noted that the guest user does not need to perform authentication such as a password or the like.

The specific operation includes a fader operation at least at the time of the custom mode. When the guest user is selected, only an operation of the fader 41 is enabled when the CUSTOM1 switch 155 or the CUSTOM2 switch 156 is selected, and an operation of the fader 41 in other fader banks is disabled, for example. In addition, when the guest user is selected, the audio mixer 10, even when receiving simultaneous selection of the CUSTOM1 switch 155 and the CUSTOM2 switch 156, disables switching to the second mode.

Figure 8:
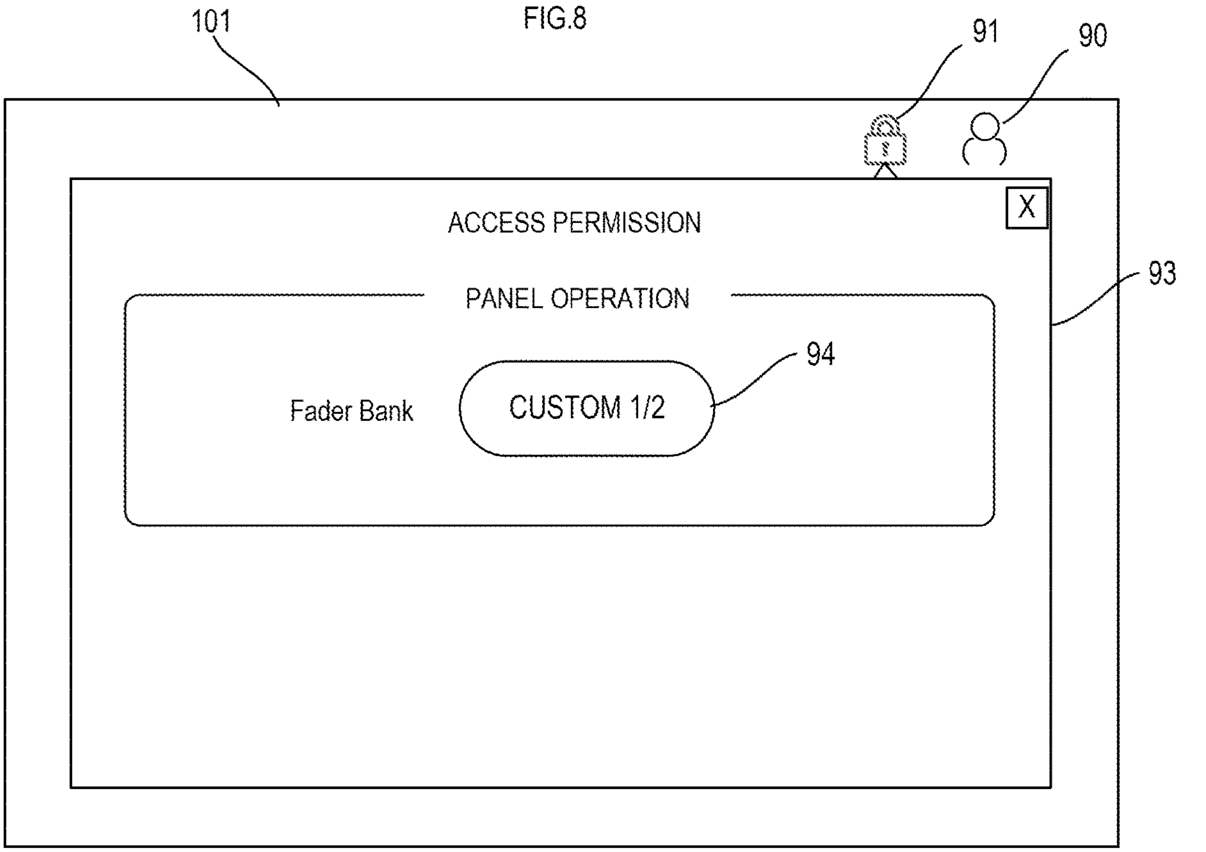
FIG. 8 is a view showing an example of a setting screen of user authority.

FIG. 8 is a view showing an example of a setting screen of user authority. As shown in FIG. 6, the touch panel display 101 always displays the status button 90 and the key button 91. The touch panel display 101, when receiving an operation of the key button 91, displays a setting screen 93 shown in FIG. 8 (S12). It is to be noted that the touch panel display 101 may display the setting screen 93 when the administrator is selected (when Yes in S13 in FIG. 5).

The setting screen 93 is able to be used to enable or disable an operation of the fader 41 in a certain fader bank. In the example of FIG. 8, an operation of the fader 41 in the custom mode is set to be enabled for the guest user. An operation to other fader banks is set to be disabled. The administrator touches an icon 94 displayed on the touch panel display 101, and can change a fader bank to be permitted to a guest user.

In FIG. 8, the touch panel display 101, although showing a screen to enable or disable a fader bank, may display a screen to further enable or disable other operations. For example, the touch panel display 101 may display a screen to enable or disable an operation on the touch panel display 101, for a guest user. In addition, the touch panel display 101 may display a screen to enable or disable a user-defined key (not-shown) that is able to assign any function or an ON key that switches ON and OFF of each channel.

Figure 9:
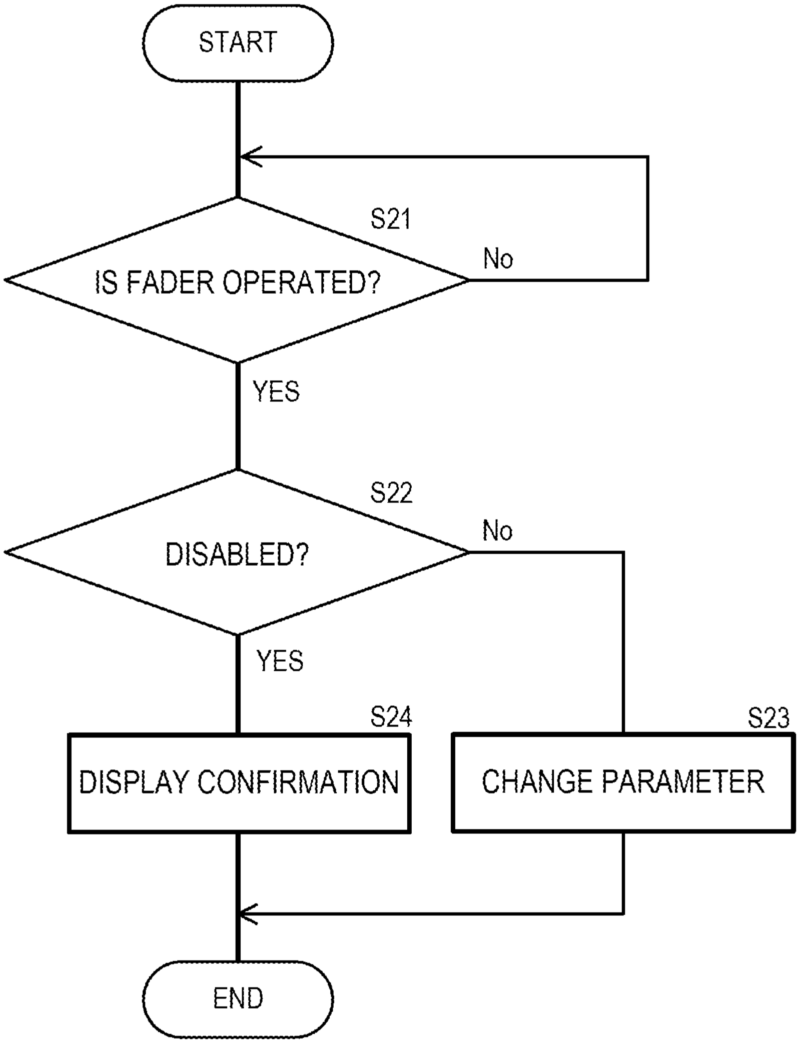
FIG. 9 is a flow chart showing an operation of the audio mixer 10 when a fader 41 is operated.

Subsequently, FIG. 9 is a flow chart showing an operation of the audio mixer 10 when the fader 41 is operated. The audio mixer 10, when the fader 41 is operated (Yes in S21), determines whether an operation of a currently designated fader bank (channel group) is set to be enabled or set to be disabled (S22).

The audio mixer 10, when determining that the operation of the currently designated fader bank (channel group) is set to be enabled, changes a parameter according to the operation of the fader 41, and performs signal processing of a corresponding channel based on a changed parameter (S23). For example, in a state in which the administrator is selected, an operation of the fader 41 of all the fader banks is enabled. In a state in which the guest user is selected, only the operation of the fader 41 of a fader bank in the custom mode is enabled.

The audio mixer 10, when determining that the operation of the currently designated fader bank (channel group) is set to be disabled, performs display confirmation display such as "fader operation is disabled" on the touch panel display 101 (S24), and does not change the parameter according to the fader 41.

Figure 10:
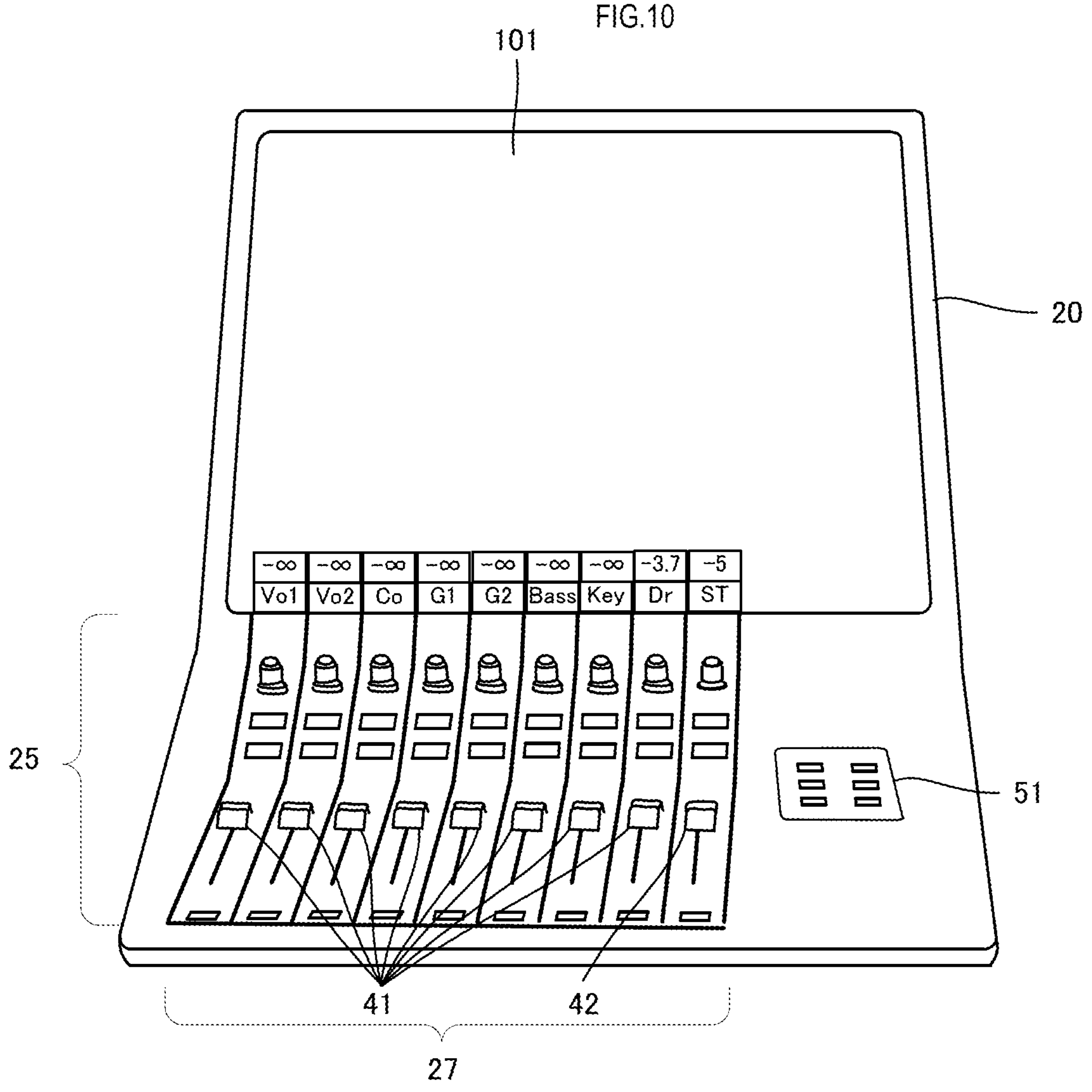
FIG. 10 is a diagram showing an example of a channel overview screen.

In such a manner, the audio mixer 10 according to the present embodiment enables only the operation of the fader 41 in the custom mode, for the guest user. As a result, even when an engineer who is accustomed to operating an audio mixer has a general user who is not accustomed to operating an audio mixer operate an audio mixer, there is no risk of having an important parameter changed. In addition, the guest user, while maintaining the content of the parameter the engineer has set in detail, can only a volume operation specific to a real situation, and can operate the audio mixer at ease. For example, as shown in FIG. 10, the administrator, in the custom mode, sets a channel name of Vocal 1 (Vo1), Vocal 2 (Vo2), Chorus (Co), Guitar 1 (G1), Guitar 2 (G2), Bass (Bass), Keyboard (Key), and Drum (Dr) to each of the input channel sections. The guest user, with reference to the channel name that the engineer has set, can adjust the volume of only these channels, and does not operate complex setting of the audio mixer.

It is to be noted that, in the example of FIG. 6, the touch panel display 101 displays a selection screen to select an administrator and a guest user. However, the touch panel display 101 may further display another registered user. The administrator can designate which operation is enabled or disabled for each registered user. The registered user may be allowed to have all operations enabled, as with the administrator, or may be allowed to have only a specific operation enabled, as with the guest user. The audio mixer 10, when the registered user is selected, may perform authentication such as password input or biometrics using a fingerprint, an iris, or a face. The audio mixer 10 determines that the registered user has been selected when the authentication of a proper password input is performed.

The descriptions of the embodiments of the present disclosure are illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

What is claimed is:

1. A sound processing apparatus comprising:

a plurality of first physical controllers provided corresponding to each of a plurality of channels, and changing a parameter in each of the plurality of channels;

a second physical controller that designates a channel to be assigned to each of the plurality of first physical controllers, to at least either a first channel group or a second channel group;

a third physical controller that receives an enablement-disablement setting of an operation to the plurality of first physical controllers for at least either the first channel group or the second channel group; and a processor that:

controls signal processing of the channel assigned to each of the plurality of first physical controllers, based on a parameter indicated by each of the plurality of first physical controllers;

enables a parameter change operation by the plurality of first physical controllers when a channel group set to be enabled by the third physical controller is designated; and disables the parameter change operation by the plurality of first physical controllers when a channel group set to be disabled by the third physical controller is designated.

2. The sound processing apparatus according to claim 1, wherein:

the processor identifies a first user and a second user;

the third physical controller, when the first user is identified, receives the setting; and the processor, when the second user is identified and the channel group set to be disabled is designated by the second physical controller, disables the parameter change operation by the plurality of first physical controllers.

3. The sound processing apparatus according to claim 2, wherein the processor:

causes the plurality of first physical controllers to function as a first mode of functioning as a physical controller to change the parameter or a second mode of functioning as a physical controller to execute a function for a different sound processing apparatus to be connected to the sound processing apparatus; and disables switching to the second mode when the second user is identified.

4. The sound processing apparatus according to claim 1, wherein at least either the first channel group or the second channel group corresponds to a custom mode in which the channel to be assigned to each of the plurality of first physical controllers is able to be optionally set.

5. The sound processing apparatus according to claim 4, wherein the processor, when the first channel group or the second channel group corresponding to the custom mode is designated, disables the parameter change operation by the plurality of first physical controllers.

6. The sound processing apparatus according to claim 1, wherein at least either the first channel group or the second channel group corresponds to a fixed mode in which the channel to be assigned to each of the plurality of first physical controllers is previously fixed.

7. A controlling method of a sound processing apparatus, the sound processing apparatus comprising:

a plurality of first physical controllers provided corresponding to each of a plurality of channels, and changing a parameter in each of the plurality of channels;

a second physical controller that designates a channel to be assigned to each of the plurality of first physical controllers, to at least either a first channel group or a second channel group; and a third physical controller that receives an enablement-disablement setting of an operation to the plurality of first physical controllers for at least either the first channel group or the second channel group, the controlling method comprising:

controlling signal processing of the channel assigned to each of the plurality of first physical controllers, based on a parameter indicated by each of the plurality of first physical controllers;

enabling a parameter change operation by the plurality of first physical controllers when a channel group set to be enabled by the third physical controller is designated; and disabling the parameter change operation by the plurality of first physical controllers when a channel group set to be disabled by the third physical controller is designated.

8. The controlling method according to claim 7, further comprising:

identifying a first user and a second user;

receiving the setting by the third physical controller when the first user is identified; and disabling the parameter change operation by the plurality of first physical controllers when the second user is identified and the channel group set to be disabled is designated by the second physical controller.

9. The controlling method according to claim 8, further comprising:

causing the plurality of first physical controllers to function as a first mode of functioning as a physical controller to change the parameter or a second mode of functioning as a physical controller to execute a function for another sound processing apparatus to be connected to the sound processing apparatus; and disabling switching to the second mode when the second user is identified.

10. The controlling method according to claim 7, wherein at least either the first channel group or the second channel group corresponds to a custom mode in which the channel to be assigned to each of the plurality of first physical controllers is able to be optionally set.

11. The controlling method according to claim 10, further comprising disabling the parameter change operation by the plurality of first physical controllers when the first channel group or the second channel group corresponds to the custom mode is designated.

12. The controlling method according to claim 7, wherein at least either the first channel group or the second channel group corresponds to a fixed mode in which the channel to be assigned to each of the plurality of first physical controllers is previously fixed.

* * * * *